United States Patent
Dunn et al.

(10) Patent No.: US 6,611,831 B1
(45) Date of Patent: Aug. 26, 2003

(54) METHOD FOR WORLDWIDE ADMINISTRATION OF ADVANCED NUMBER PORTABILITY NUMBERS

(75) Inventors: James Patrick Dunn, Sandwich, IL (US); Ronald Bruce Martin, Carol Stream, IL (US); John William Peterson, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 268 days.

(21) Appl. No.: 09/633,668

(22) Filed: Aug. 7, 2000

(51) Int. Cl.[7] .............................................. G06F 17/30
(52) U.S. Cl. ................. 707/3; 379/221.13; 379/210.02; 379/220.01; 707/10; 707/104.1
(58) Field of Search ......................... 379/32.03, 221.13, 379/210.02, 212.01, 216.01, 289, 219, 220.01, 221.01, 201.02; 707/3, 2, 104.1, 10

(56) References Cited

U.S. PATENT DOCUMENTS

| | | | | |
|---|---|---|---|---|
| 5,237,604 A | | 8/1993 | Ryan | 379/220 |
| 5,717,749 A | * | 2/1998 | Sneed et al. | 379/219 |
| 5,740,239 A | | 4/1998 | Bhagat et al. | 379/243 |
| 5,793,857 A | * | 8/1998 | Barnes et al. | 379/221.02 |
| 5,883,948 A | * | 3/1999 | Dunn | 379/14 |
| 5,901,214 A | * | 5/1999 | Shaffer et al. | 379/207.12 |
| 5,910,981 A | | 6/1999 | Bhagat et al. | 379/219 |
| 6,009,160 A | * | 12/1999 | Sonnenberg | 379/207.02 |
| 6,097,801 A | * | 8/2000 | Williams et al. | 370/385 |
| 6,137,873 A | * | 10/2000 | Gilles | 379/202.01 |
| 6,205,126 B1 | * | 3/2001 | Moon | 370/259 |
| 6,327,360 B1 | * | 12/2001 | Hokari | 379/207.08 |

* cited by examiner

*Primary Examiner*—John Breene
*Assistant Examiner*—Miranda Le

(57) ABSTRACT

A method for discovering and assigning telephone numbers that have commercial, trademark or vanity significance to requesting subscribers on a worldwide scale. The method includes determining numbers that have value because they potentially will be requested for commercial, trademark or vanity purposes by companies or persons active in various locations in the world. Language translations and transliterations are also taken into account in order to obtain a telephone number that will retain its commercial, trademark or vanity value in an area that speaks a different language.

20 Claims, 6 Drawing Sheets

METHOD FOR WORLDWIDE ADMINISTRATION OF ADVANCED NUMBER PORTABILITY NUMBERS

TECHNICAL FIELD

This invention relates to worldwide network telephone systems and more particularly to telephone number portability within worldwide network telephone systems and the assignment of telephone numbers therein.

BACKGROUND OF THE INVENTION

The public telephone system is operated by entry of a series of numbers by such means as pulse dialing a rotary telephone, pressing buttons of a push button telephone to enter dual tone multiple frequency (DTMF) or pulse codes, and initiating some automatic entry device such as a modem or facsimile machine or out-of-band customer premises equipment signals as in ISDN sets. Currently within United States local telephone calls require seven digits (YXX-XXXX) and long distance calls require the same seven digits plus a three digit area code at the beginning. A long distance code digit of "1" or some other long distance code is also added before the area code and the seven digit local number. Originally the first three digits of a local number identified the telephone switch that would process the call, and to a great extent still do. That was the switch to process the call because historically that was also the switch to which the telephone having that local number was connected. As the original regulated telephone service monopoly to break up and competition began, the idea of number portability became important and popular. A basic form of number portability for people who wanted it is shown in U.S. Pat. No. 5,237,604 issued Aug. 17, 1993 to D. Ryan. In the Telecommunications Act of 1996 local telephone service companies are required to provide local telephone number portability where possible.

Since the Telecommunications Act of 1996, the public switched telephone network (PSTN) has continued to become more open and competitive. Many localities already have multiple mobile telephone service providers, multiple long distance service providers and multiple local service providers. For customers to receive the maximum benefit from such competition, true portability of telephone numbers must be provided. Telephone number portability allows the customer to change service providers and/or geographic locations without changing telephone numbers. For commercial enterprises that is important because it means the telephone numbers on the stationary, the business cards, the yellow page advertisements, the fax machine settings and their customers' memories do not have to change to remain successful when the enterprise changes its service provider. This is especially important if a customer has a special number that takes advantage of the letter sub-sets of the alphabet that appear on numbers 2 through 9 of a rotary dial or a push button keypad to spell out some significant sequence. Examples of such numbers for toll free commercial entities are: "1-800-ABCDEFG" (also known as "1-800-222-3334") for selling reading and spelling learning aids, or "1-800-HOLIDAY" (also known as "465-4329") for Holiday Inn Hotel reservations and information. Holiday Inn Hotel is a trademark of Bass Hotels and Resorts Inc. Non-toll free special numbers either long distance or local are possible also. Such numbers have a goodwill value, which would be lost if the number was not portable when the customer changed service providers.

Because of the costs in customer goodwill, stationary, and personal contacts, many areas have mandated number portability. Number portability means that numbers not normally assigned to a local telephone switch can be transferred to customers of such a local switch. That is why number portability is sometimes referred to as personal numbering. But the very existence of number portability/personal numbering frees telephone numbers and opens the door for enlarged use of telephone numbers. Such enlarged use is possible anywhere that telephone calls can be made by dialing or keying according to alphabetic characters on the calling terminal, no matter what language or alphabet is used. Because of the value personal numbering can have worldwide it is desirable that such be extended to other countries and other languages, where possible.

SUMMARY OF THE INVENTION

Briefly stated in accordance with one aspect of the invention, the aforementioned problems are addressed and an advance in the art achieved by providing a method of assigning a telephone number to a subscriber that has an intrinsic value. The method includes the steps of: creating a first database of valuable combinations at a first location; comparing numbers not in use at the first location to the first database of valuable combinations to create a first database of valuable combinations available for assignment; creating a second database of valuable combinations at a second location; comparing numbers' not in use at the second location to the second database of valuable combinations to create a second database of valuable combinations available for assignment; searching the first database of valuable combinations available for assignment with a keyword; searching the second database of valuable combinations available for assignment with the keyword; returning results to the subscriber of the keyword search of the first database of valuable combinations available for assignment offering the subscriber a first number for the first location; returning results to the subscriber of the keyword search of the second database of valuable combinations available for assignment offering the subscriber a second number for the second location. Upon subscriber's acceptance, the first and second numbers are assigned to subscriber in their respective locations. After the numbers are assigned, they are removed from the databases containing available numbers. Because of differences in number control and allocation in the first and second locations, the first number and the second number can be and are identical. Where identical numbers are not available in the first and second locations, the first and second numbers searched out and assigned have the same terminating digits.

In accordance with another aspect of the invention, the aforementioned problems are addressed and an advance in the art achieved by providing a method of assigning a telephone number to a subscriber that has an intrinsic value. The method includes the steps of: creating a first database of valuable combinations at a first location; comparing numbers not in use at the first location to the first database of valuable combinations to create a first database of valuable combinations available for assignment; creating a second database of valuable combinations at a second location; comparing numbers not in use at the second location to the second database of valuable combinations to create a second database of valuable combinations available for assignment; searching the first database of valuable combinations available for assignment with a keyword; searching the second database of valuable combinations available for assignment with the keyword; returning results to the subscriber of the keyword search of the first database of valuable combinations available for assignment offering the subscriber a first number for the first location; returning results to the subscriber of the keyword search of the second database of valuable combinations available for assignment offering the subscriber a second number for the second location; searching for the keyword in a third database of numbers not in use in a third location having a different country code than the first and the second locations; and returning results to the subscriber of the keyword search of the third location and offering subscriber a third number for the third location. Upon subscriber's acceptance, the first, second and third numbers are assigned to subscriber in their respective locations. After the numbers are assigned, they are removed from the respective databases containing available numbers.

DETAILED DESCRIPTION

Figure 1:
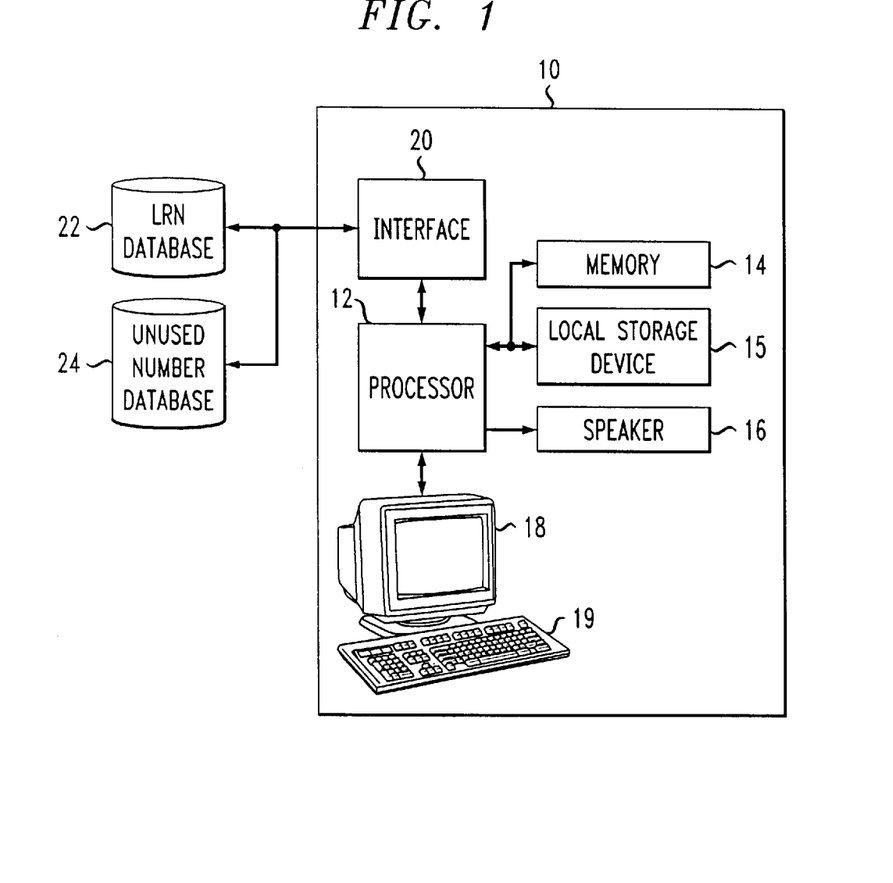
FIG. 1 is a simplified block of a workstation for finding valuable number sequences.

FIG. 1 is a simplified block of a work station 10 useful for practicing an embodiment of the invention. The work station 10 has a processor unit 12 which processes information and outputs information in various forms. Processor 12 is connected to a memory 14 for storing long-term and short term information. Memory 14 may include ROM and RAM or their equivalents, as is known in workstations. Processor 12 is also connected to a local storage device 15, which may be a magnetic disk or similar device for long term storage of fairly large amounts of information such as application programs, files, records, and databases. Processor 12 is also connected to user input and output devices 16, 18 and 19. Output device 16 is a speaker which allows the user to hear beeps and clicks that workstations sometimes output as cues to the operator that something is being processed or needs operator input. Speaker 16 is also used to audibly present tone sequences such as dual tone multiple frequency (DTMF) sequences to a user for evaluation. Processor 12 is also connected to a keyboard 19 and a display 18 in order to enable input from a user and visual output to a user, as is common with workstations.

Processor 12, memory 14, local storage device 15, speaker 16, display 18 and keyboard 19 enable workstation 10 to perform many reading, comparing, querying and writing tasks on integers, characters and databases quite well. Workstation 10 has considerable capabilities in those areas as a stand alone unit; however, interface 20 allows the workstation 10 to connect to the outside world. In this case, the outside world includes a telecommunications signaling network world and telecommunications network databases, such as local routing number (LRN) database 22. LRN database 22 contains the local routings for all the exchanges for all the local switches that use the database 22. LRN database 22 besides keeping local routing information for numbers in use, also keeps unused number information for the area served by the local switches. This group of unused numbers is used primarily for assigning telephone numbers to new applicants.

Interface 20 also connects workstation 10 to another database, the unused number database (UNDB) 24. UNDB 24 is populated with unused numbers from the other databases, such as LRN 22, and may contain numbers from other than the local routing switch area. The unused numbers in UNDB 24 may be already grouped into groups of numbers that have some intrinsic value and groups of numbers that have been found not to have intrinsic value beyond being able to complete a call. Workstation 10 or a similar station is capable of providing and might provide the testing/filtering action according to names, synonyms, alternative spellings, etc., needed to separate the numbers with intrinsic value from those not found to have intrinsic value.

Figure 2:
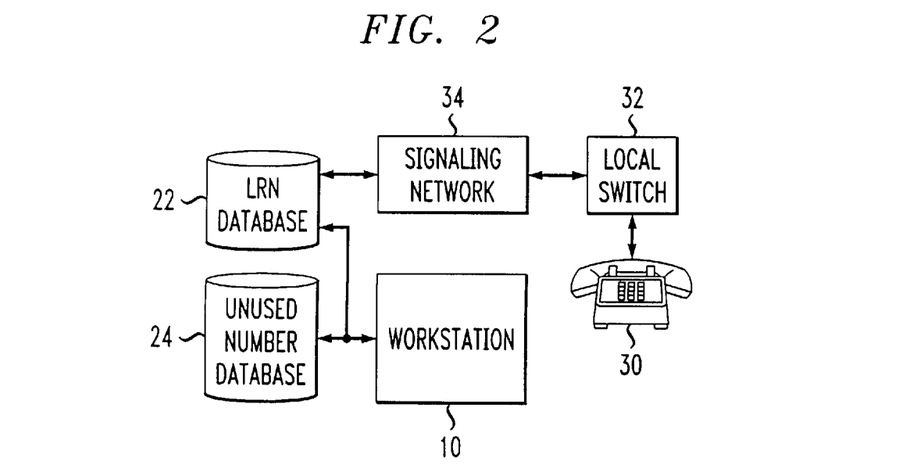
FIG. 2 is a block diagram of a system for finding and using valuable number sequences.

Alternatively, UNDB 24 is just a database of all unused numbers that are available to a user in the user's location. In such a case, the accessing terminal initiates a search of possible number combinations using various rules, such as rules regarding synonyms, and alternative spelling. Such a system is shown in FIG. 2. A user at terminal 30 is connected to a local switch 32. Terminal 30 must at least be a DTMF telephone, but could be more sophisticated such as an ISDN terminal or even a computer terminal. Terminal 30 calls a number selection service number for requesting commercially significant and vanity (CSV) telephone numbers on switch 32. Upon receiving a call from terminal 30, local switch 32 replies with a request that the user at terminal 30 enter the desired CSV number. Local switch 32 then queries databases 22 and 24 via signaling network function 34 as to the availability of the requested CSV number. LRN DB 22 and UNDB 24 respond to local switch 32 with a number available or a number not available response. If the user requested CSV number is available, then local switch 32 assigns that number to the user and makes charges according to whatever financial arrangements exist between the service provider owning local switch 32 and the user. Along with the character by character query, local switch 32 may also query LRN DB 22 and UNDB 24 for related CSV number candidates that are not character by character matches. The query for numbers related to a user CSV numbers takes some processing power, which may be at switch 32, in the databases themselves 22, 24 or resort may be made to a workstation such as workstation 10. The query for related numbers will be a limited special case of the process that searches for CSV numbers, so workstation 10 is a good choice to provide the processing power.

One or more CSV number candidates are returned from LRN DB 22 and UNDB 24, they are presented to the user for selection and approval. Preferably, any price premium(s) for high intrinsic value number(s) is presented at this time for user's selection and approval, also. Thus, the user can evaluate whether the CSV number is worth the premium cost. If the CSV number is not worth the cost, but the user needs a new telephone number of some sort, one of the non-premium numbers is issued to the user. If one of the vanity numbers is worth the cost, the user accepts a premium number and the premium cost. This cost may be billed to the user's telephone bill, or charged to an account number, such as a credit card account. After selection of a number by the user, the number is removed from the data base of unused numbers in UNDB 24 so it will not be issued to someone else.

Figure 3:
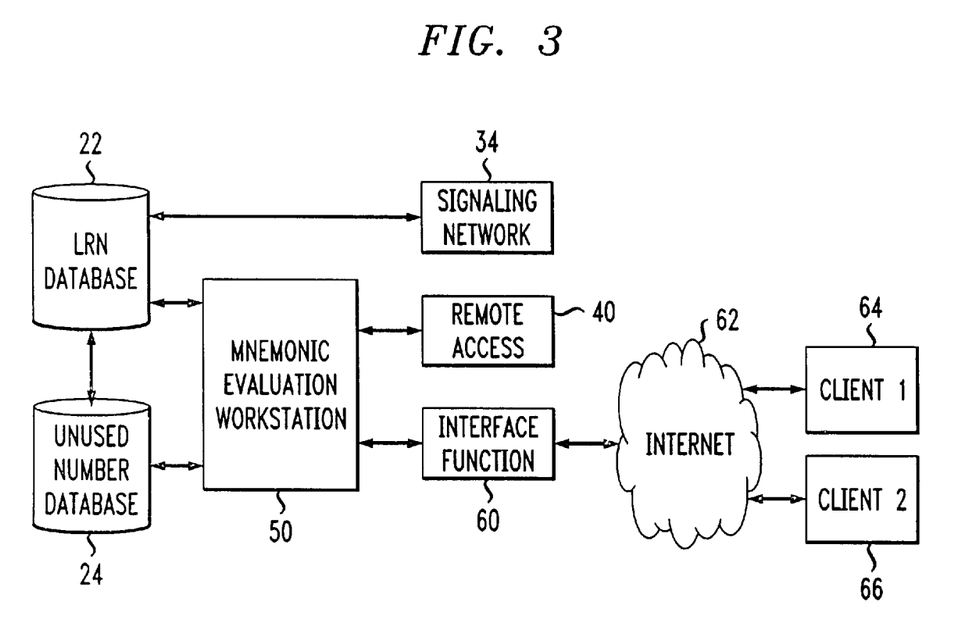
FIG. 3 is a block diagram of a system for matching a subscriber's inquiry for a type of valuable number sequences.

Referring now to FIG. 3, another embodiment of the present invention will be described. This embodiment concerns a sale of a user's existing telephone number as a premium number. Often commercial users are assigned a block of telephone numbers for a fee. This embodiment recognizes that quite often the entire block is not used by the commercial enterprise and that there may be some premium number combinations within the block. With the flexibility of number portability, unused premium numbers could be offered and sold by the block number holder. Such a commercial user would use remote access terminal 40, or a similar device to access MNEMONIC EVALUATION WORKSTATION 50. MNEMONIC EVALUATION WORKSTATION 50 receives one or more numbers from remote access unit 40 that the commercial user would like to sell. Workstation 50 processes the query or queries from remote access unit 40 to evaluate the value of the number(s) provided according to programmed rules. The numbers are evaluated for context as a word, context as a string of words, context as an alphabetic string, context as an alpha-numeric string and context as a tone sequence. Workstation 50 uses a rules based program similar to the premium number finding program used by workstation 10 to come up with a premium number database in order to evaluate the value of the number submitted for sale by the user. Word contexts may be exact spellings of names or descriptive nouns. For example, for a bakery, a number containing 'bakery' (225379) would be a direct context. Further, telephone numbers containing words such as 'bread' (27323) or 'cakes' (22537) might also make good telephone numbers for a bakery. Workstation 50 also looks for word strings: 'hot buns' is an example of a possible two word string for a bakery. Alphabetic strings are inexact spellings of words such as 'bakry' (22579) for a bakery. Alphanumeric strings are strings that describe the user using letters and numbers somehow. Bakery1 (2253791) is one example for bakery number one. Tonal strings are tone sequences that have some meaning to the caller and thus aid in remembering the number. The tone sequence 3334 or 33343334, which sound like the theme of Beethoven's fifth symphony, are examples of possible numbers for a music store or a local symphony's ticket and information number. Tone sequence rules about determining dominate themes from number of times used in a work and tone translation/transposition rules to establish known tone sequences available by DTMF tones on a telephone are used. Once such tone sequence rules are set up, workstation 50 builds a database of tone sequences and associate the context of the work with the derived sequence by processing musical pieces. Alternatively, a human with knowledge of significant musical tone sequences would perform the tone sequence database.

Once workstation 50 has been programmed to process number queries, it may accept numbers for evaluation from remote access unit 40. The workstation 50 can offer the commercial user a predetermined price depending on how long the number is and how good a CSV word (i.e. exact spelling vis-a-vis a phonic or approximate spelling) it is and the user can purchase the number or not. Alternatively, the number or numbers may be auctioned off. Such an auction could be held on the world wide web or some equivalent public forum. To facilitate such an auction, the offered numbers would be set out on a web page after being processed by workstation 50. Workstation 50 or some other workstation (not shown) would operate as a web server. The web server would connect via interface 60 to the Internet 62. Client 1 (64) and client 2 (66) using web browsers or similar interfaces would view the web page and have an opportunity to bid on the premium telephone numbers. Upon the end of the auction, the web server workstation would charge the winning party the auction price and issue the number to the winning party.

Figure 4:
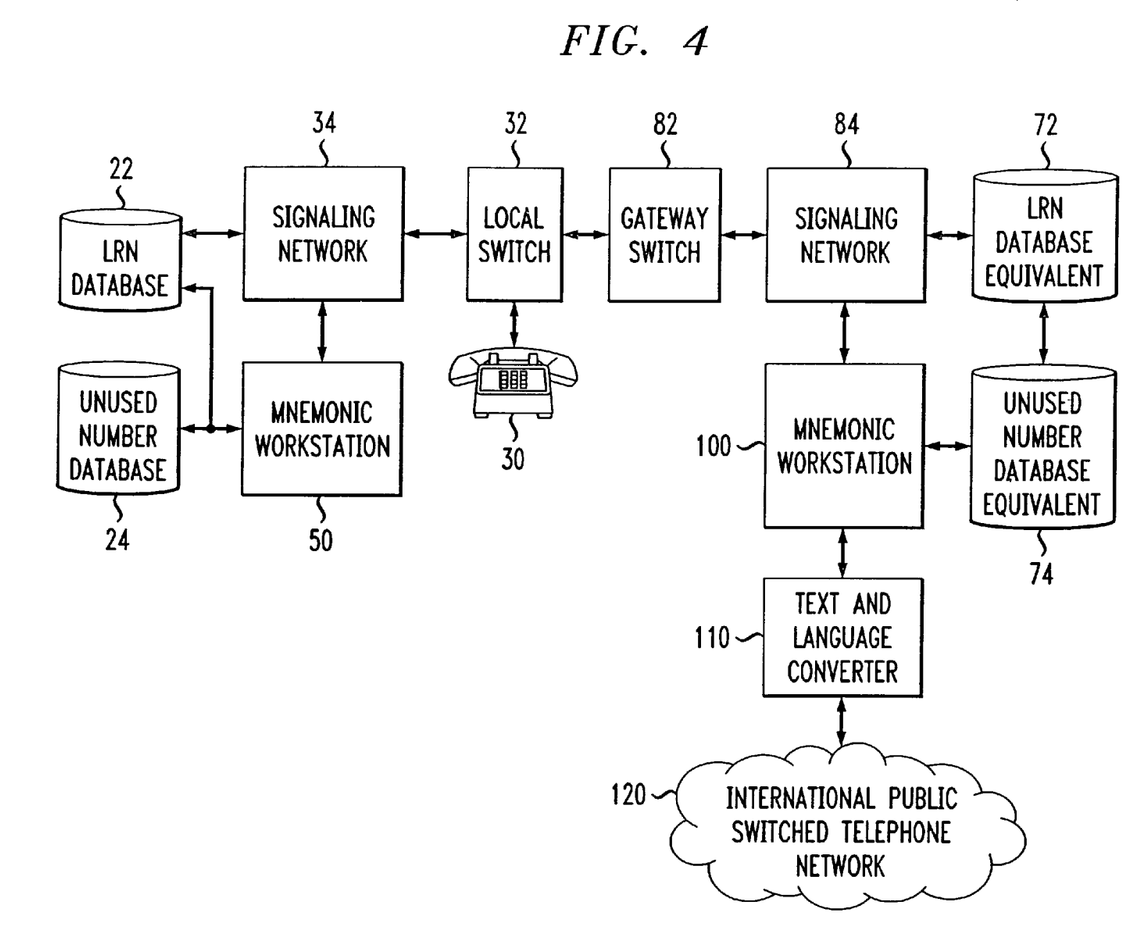
FIG. 4 is a block diagram of a system for matching a subscriber's inquiry or its equivalent for a type of valuable number sequences that goes beyond the local switch and includes inquiries in other countries and in other languages.

Until now, the description has concerned embodiments that involved the local switch. The remaining embodiments described concern embodiments that involve other switches or other public switched telephone networks. Referring now to FIG. 4, an embodiment useful for obtaining worldwide telephone numbers that have a premium value is shown. It should be noted that items with similar numbers in different figures perform similar functions. This embodiment concerns a purchase of an existing telephone number as a premium number. Often commercial companies change their names and/or trademarks and would like a new telephone number to go along with their name or trademark. Further, multinational companies would like new telephone numbers around the world that go with their name or trademark. Also, within countries where there are areas where the population speaks a language that is different from the country's dominate language, multinational companies may want their names or trademarks translated in that different language. With the flexibility of number portability and the global reach of telecommunication systems, unused premium numbers fitting a multinational company's needs could be identified, offered and issued.

Consider, as an example, a commercial subscriber (or a private individual who does not mind the cost) would enter a request upon terminal 30, or a similar device to access MNEMONIC EVALUATION WORKSTATION 50 via local switch 32 and signaling network unit 34. MNEMONIC EVALUATION WORKSTATION 50 receives one or more numbers from terminal 30 that correspond to one or more keywords which the user would like to use. Workstation 50 processes the query or queries from terminal 30 and evaluates the value of the number(s) requested. The numbers are evaluated for context as a word, context as a string of words, context as an alphabetic string, context as an alpha-numeric string and context as a tone sequence. Workstation 50 uses a rules based program similar to the premium number finding program used by workstation 10 to come up with a premium number database in order to evaluate the value of the number submitted for sale by the user. As described for the embodiment of FIG. 3, word contexts may be exact spellings of names or descriptive nouns. For example, for a bakery, a number containing 'bakery' (225379) would be a direct context. Further, telephone numbers containing words such as 'bread' (27323) or 'cakes' (22537) might also make good telephone numbers for a bakery. Workstation 50 also looks for word strings: 'hot buns' is an example of a possible two word string for a bakery. Alphabetic strings are inexact spellings of words such as 'bakry' (22579) for a bakery. Alphanumeric strings are strings that describe the user using letters and numbers somehow. Bakery1 (2253791) is one example for bakery number one. Tonal strings are tone sequences that have some meaning to the caller and thus aid in remembering the number. The tone sequence 3334 or 33343334, which sound like the theme of Beethoven's fifth symphony, are examples of possible numbers for a music store or a local symphony's ticket and information number. Tone sequence rules about determining dominate themes from number of times used in a work and tone translation/ transpositions to establish known tone sequences available on a telephone are used. Once such rules are set up, workstation 50 can build a database of tone sequences and associate the context of the work with the derived sequence by processing musical pieces.

Workstation 50 processes the queries for numbers from terminal 30. If the numbers are found available, workstation 50 can offer the user a predetermined price depending on how long the number is and how good a word (i.e. exact spelling vis-a-vis a phonic or approximate spelling) and the user can take it or decline.

For locations other than local, even worldwide locations, the request can go beyond the local switch 32 and beyond even national calling numbers. In such a case, the request goes through gateway switch 82 and signaling network 84, to a mnemonic workstation 100 located in a different location. The workstation 100 is essentially the sane as workstation 50, only workstation 100 queries the databases 72 and 74 for available numbers in its location that are some type of match for the subscriber's queries. Many times different locations will have the same last numbers but differ in area code, or in the case of toll free numbers, i.e. 800, 888, 887 etc., the same number can be used by different subscribers as long as they are in different locations. Without the location constraint, such numbers could not be subject to number portability, unless the subscriber would be willing to pay for both.

So workstation 100 queries databases 72 and 74 and returns the results to subscriber on terminal 30. The subscriber's request can be either directly to workstation 100, or the request may be coordinated and made through workstation 50. The subscriber then may see what numbers, and hence keywords, are available not only on local databases 22 and 24 for the local area, but also what is available on a second location on databases 72 and 74.

In addition to just looking in other parallel locations and databases, a query may also be made for numbers that correspond to the subscriber's name, trademark or business but are in a different language. For example, multinational companies often pick unique names so they will be available as trademarks, and such companies would then be in the market for telephone numbers that somehow correspond to their tradename or business in different countries where they do business. To provide for multilingual queries, the subscriber on terminal 30 sends a query or queries in one language to workstation 50 or workstation 100 for resending to text-and-language-converter 110. This query preferably would contain limitations of what languages the subscriber wishes the query to be translated into. Text and language converter 110 takes the query or queries in the submitted language, translates it using commercially available first language-to-second language translation programs. If translation produces no results, as often occurs with completely made up trademarks, text-and-language converter performs transliteration including any standard character conversions for importing non-native words into the second language. A check is made in a computer dictionary of the second language at this point and the subscriber is notified of any match. This is a notice that the word has meaning in the second language. That meaning should be explored offline to prevent the accidental selection of a word with a negative denotation or connotation. Next, text and language converter 110 sends requests for those specific telephone numbers over the international public switched telephone network 120 to the designated countries to see if the numbers are available in those countries. If the numbers are available, text and language converter 110 reports to workstation 100 that the numbers are available or not, and workstation 100 reports that back to subscriber at terminal 30. If the numbers are available in the second language, subscriber can accept them, and workstation 100 will arrange the issuance of the numbers to subscriber from the designated PSTN.

This is made possible and practical because of mandated number portability in some locations so numbers can migrate across more than one switch location. It is also made possible by the databases of available numbers that can be queried from another location. Databases which are maintained at the various locations.

Figure 5:
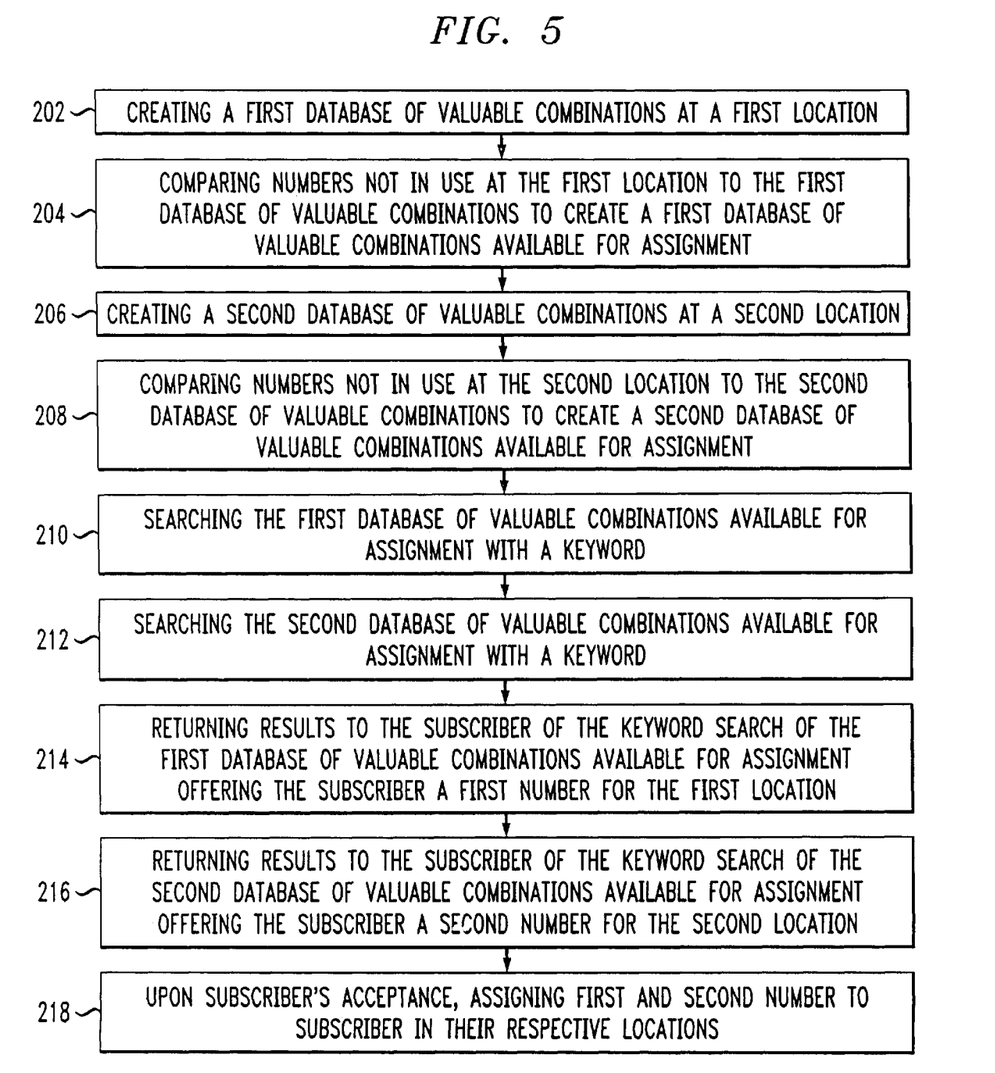
FIG. 5 is a flow diagram illustrating an exemplary method in accordance with present invention.

FIG. 5 is a flow diagram of an embodiment of a method in accordance with the present invention. In step 202 a first database is created of valuable combinations at a first location. Numbers not in use at the first location are compared in step 204 to the first database of valuable combinations to create a first database of valuable combinations available for assignment. In step 206 a second database is created of valuable combinations at a second location. Numbers not in use at the second location are compared in step 208 to the second database of valuable combinations to create a second database of valuable combinations available for assignment. In steps 210 and 212 the first and second databases of valuable combinations available for assignment are searched, respectively, with a keyword. In step 214 the results of the keyword search of the first database of valuable combinations available for assignment are returned to the subscriber thereby offering the subscriber a first number for the first location. In step 216 the results of the keyword search of the second database of valuable combinations available for assignment are returned to the subscriber thereby offering the subscriber a second number for the second location. Upon the subscriber's acceptance in step 218, the first and second numbers are assigned to the subscriber in their respective locations. The first number and second number may be the same number, have the same last seven digits, or have the same terminating digits.

Figure 6:
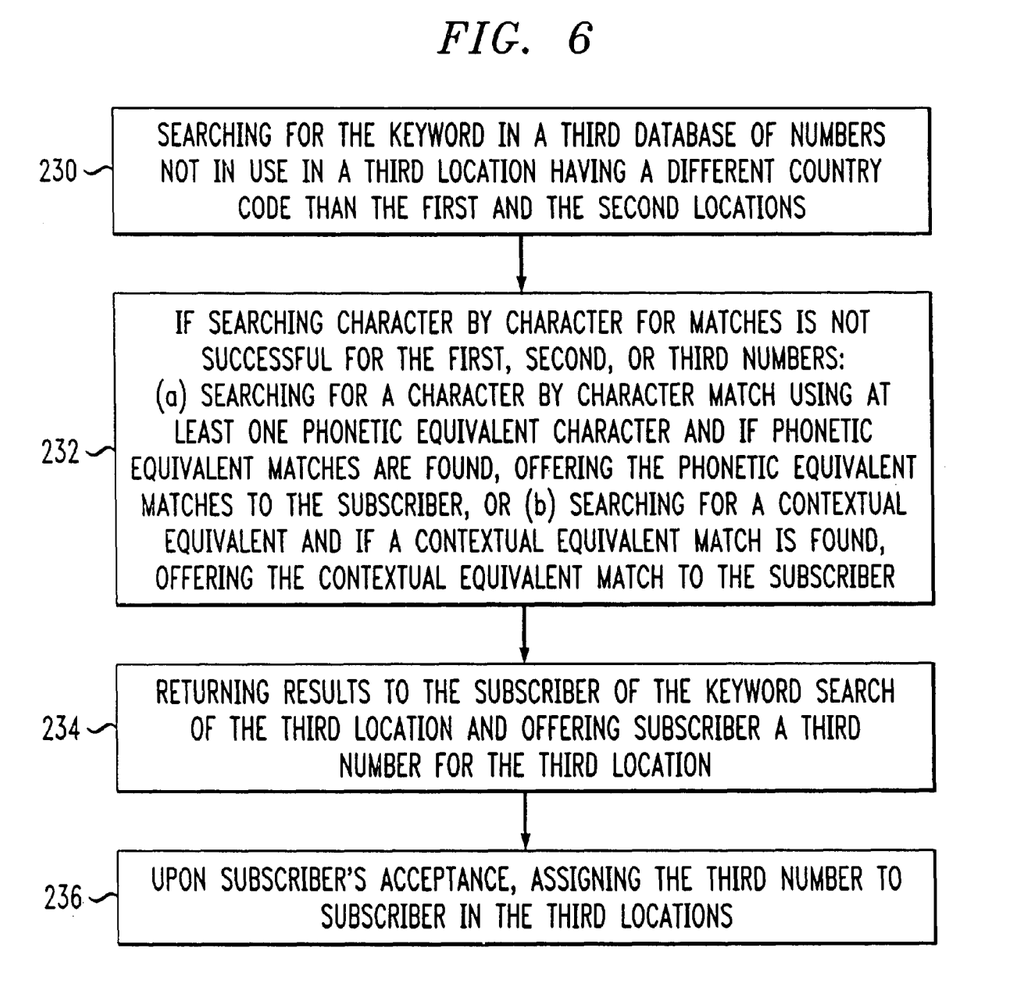
FIG. 6 is a flow diagram illustrating searching in accordance with FIG. 5 and actions taken based upon the searching results.

Referring to FIG. 6, a search is made in step 230 for the keyword in a third database of numbers not in use in a third location having a different country code than the first and second locations. Step 232 provides for alternatives for searching if a character by character match is not successful for the first, second or third numbers. In one alternative, a search is made for a character by character match using at least one phonetic equivalent character and if phonetic equivalent matches are found, offering the phonetic equivalent matches to the subscriber. In another alternative, a search is made for a contextual equivalent and if a contextual equivalent match is found, offering the contextual equivalent match to the subscriber. In step 234 results are returned to the subscriber of the keyword search of the third location and offering the subscriber a third number for the third location. In step 236 the third number is assigned, upon the subscriber's acceptance, to subscriber in the third location. The first, second and third numbers may have the same terminating digits and may be character by character matches of the keyword. The contextual equivalent may use an alphabetic string, alphanumeric string, synonym of the keyword, or a DTMF tonal sequence.

Figure 7:
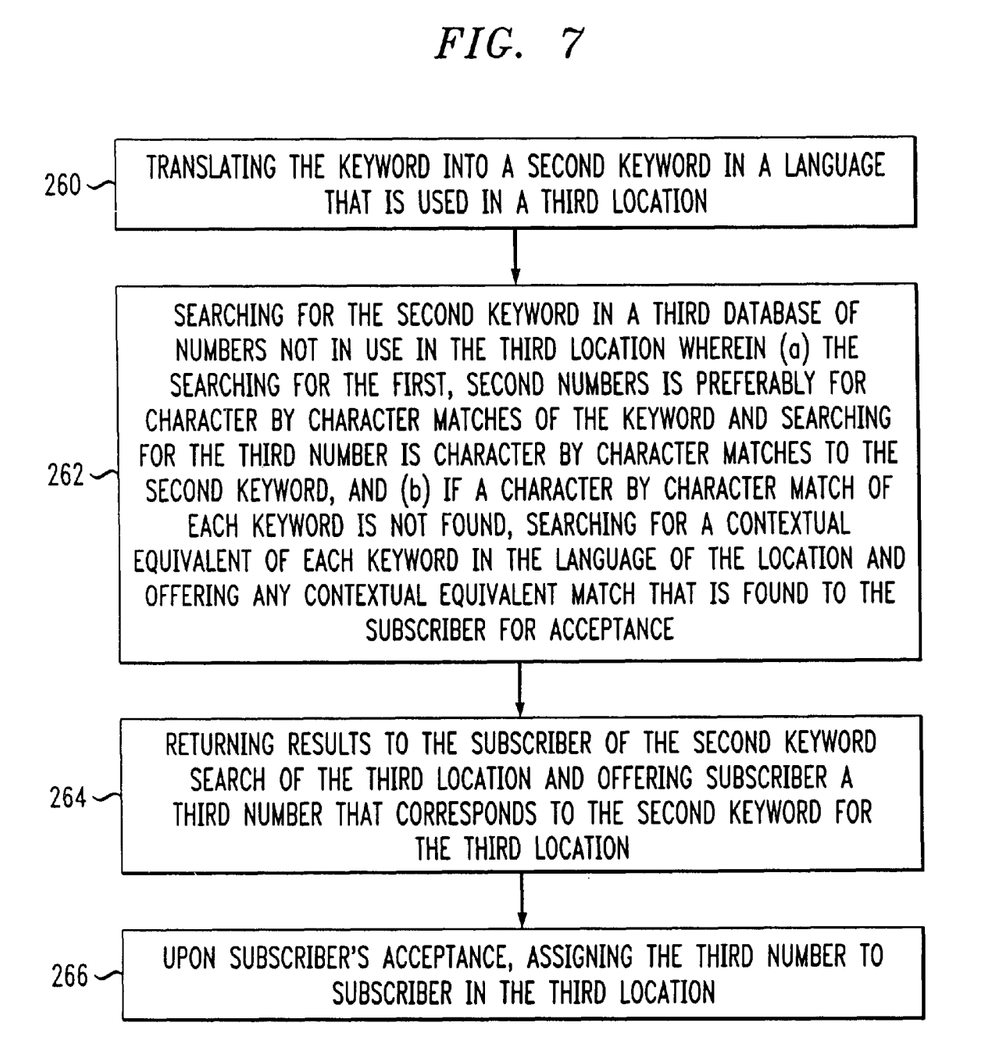
FIG. 7 is a flow diagram illustrating another embodiment of searching in accordance with FIG. 5 and actions taken based upon the searching results.

Referring to FIG. 7, the keyword is translated into a second keyword in a language that is used in a third location. In accordance with step 262 a search is made for the second keyword in a third database of numbers not in use in the third location. The searching for the first and second numbers is preferably by character by character matches of the keyword and searching for the third number is by character by character matches to the second keyword. If the character by character match of each keyword is not found, a search is made for a contextual equivalent of each keyword in the language of the location and offering any contextual equivalent match that is found to the subscriber for acceptance. In step 264 results are returned to the subscriber of the second keyword search of the third location and the subscriber is offered a third number that corresponds to the second keyword for the third location. The third number is assigned to the subscriber, upon the subscriber's acceptance, in the third location. The contextual equivalents may use an alphabetic string, an alphanumeric string, or synonyms of the keywords in their respective languages. The searching may be controlled by a workstation at the first location.

Although this invention has been described with respect to a preferred embodiment, those skilled in the art may devise numerous other arrangements without departing from the scope of the invention as defined in the following claims. For example, the workstation functions could be consolidated into one workstation as long as the different locations agreed to allow that one workstation access to all the databases involved and authority to issue numbers.

What is claimed is:

1. A method of assigning a telephone number to a subscriber comprising the steps of:
    a. creating a first database of valuable combinations at a first location;
    b. comparing numbers not in use at said first location to said first database of valuable combinations to create a first database of valuable combinations available for assignment;
    c. creating a second database of valuable combinations at a second location;
    d. comparing numbers not in use at said second location to said second database of valuable combinations to create a second database of valuable combinations available for assignment;
    e. searching said first database of valuable combinations available for assignment with a keyword;
    f. searching said second database of valuable combinations available for assignment with said keyword;
    g. returning results to said subscriber of said keyword search of said first database of valuable combinations available for assignment offering said subscriber a first number for said first location;
    h. returning results to said subscriber of said keyword search of said second database of valuable combinations available for assignment offering said subscriber a second number for said second location; and
    i. upon subscriber's acceptance, assigning said first and second number to subscriber in their respective locations.

2. The method of claim 1, wherein said first number and said second number are the same number.

3. The method of claim 1, wherein said first number and said second number have the same last seven digits.

4. The method of claim 1, wherein said first number and said second number have the same terminating digits.

5. The method of claim 1, further comprising the steps of:
    searching for said keyword in a third database of numbers not in use in a third location having a different country code than said first and said second locations;
    returning results to said subscriber of said keyword search of said third location and offering subscriber a third number for said third location; and
    upon subscriber's acceptance, assigning said third number to subscriber in the third locations.

6. The method of claim 5, wherein said first number, said second number and said third number have the same terminating digits.

7. The method of claim 5 wherein the searching for said first, second and third numbers is for character by character matches of said keyword.

8. The method of claim 7, wherein if the searching for character by character matches is not successful, searching for a character by character match using at least one phonetic equivalent character and if phonetic equivalent matches are found, offering said phonetic equivalent matches to said subscriber.

9. A method of claim 7, wherein if a character by character match is not found, searching for a contextual equivalent and if a contextual equivalent match is found, offering said contextual equivalent match to said subscriber.

10. The method of claim 9, wherein said contextual equivalent uses an alphabetic string.

11. The method of claim 9, wherein said contextual equivalent uses an alphanumeric string.

12. The method of claim 9, wherein said contextual equivalent is a synonym of the keyword.

13. The method of claim 9, wherein said contextual equivalent uses a DTMF tonal sequence.

14. The method of claim 1, further comprising the steps of:
    translating said keyword into a second keyword in a language that is used in a third location;
    searching for said second keyword in a third database of numbers not in use in said third location;
    returning results to said subscriber of said second keyword search of said third location and offering subscriber a third number that corresponds to said second keyword for said third location; and
    upon subscriber's acceptance, assigning said third number to subscriber in the third location.

15. The method of claim 14 wherein the searching for said first, second numbers is for character by character matches of said keyword and searching for said third number is character by character matches to said second keyword.

16. A method of claim 15, wherein if a character by character match of each keyword is not found, searching for a contextual equivalent of each keyword in the language of the location and offering said any contextual equivalent match that is found to said subscriber for acceptance.

17. The method of claim 16, wherein said contextual equivalents use alphabetic strings.

18. The method of claim 16, wherein said contextual equivalents use an alphanumeric strings.

19. The method of claim 16, wherein said contextual equivalents are synonyms of the keywords in their respective languages.

20. The method of claim 1 wherein said searching is controlled by a workstation at said first location.

* * * * *